United States Patent
Lindsay et al.

(10) Patent No.: US 8,251,429 B2
(45) Date of Patent: Aug. 28, 2012

(54) STRIKER WEBBING GUIDE ASSEMBLY

(75) Inventors: Derek Shane Lindsay, Marysville, OH (US); Carlington George Demetrius, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 103 days.

(21) Appl. No.: 12/846,399

(22) Filed: Jul. 29, 2010

(65) Prior Publication Data

US 2012/0025557 A1    Feb. 2, 2012

(51) Int. Cl.
*B60R 22/24* (2006.01)

(52) U.S. Cl. ............... 296/65.16; 280/808; 297/378.13; 297/473

(58) Field of Classification Search ............... 296/65.16; 280/801.1, 805–808; 297/378.13, 468, 473
See application file for complete search history.

(56) References Cited

U.S. PATENT DOCUMENTS

| 4,323,278 A | | 4/1982 | Sukopp et al. |
| 4,684,175 A | | 8/1987 | Trutter |
| 4,730,875 A | * | 3/1988 | Yoshitsugu ............... 297/468 |
| 5,263,741 A | | 11/1993 | Seros et al. |
| 5,713,634 A | * | 2/1998 | Koike ............... 297/378.13 |
| 5,730,499 A | | 3/1998 | Salisbury, Jr. |
| 5,762,401 A | | 6/1998 | Bernard |
| 5,979,991 A | | 11/1999 | Lewandowski et al. |
| 6,533,341 B2 | * | 3/2003 | Marinelli ............... 296/65.16 |
| 6,726,287 B1 | | 4/2004 | Janz |
| 7,273,232 B2 | | 9/2007 | Fontecchio et al. |
| 7,377,584 B2 | | 5/2008 | Griswold et al. |
| 2007/0085368 A1 | | 4/2007 | Hirokawa et al. |
| 2008/0217932 A1 | | 9/2008 | Yamada |

FOREIGN PATENT DOCUMENTS

| JP | 61-191453 | | 8/1986 |
| JP | 06199203 A | * | 7/1994 |
| JP | 2005186721 A | * | 7/2005 |

* cited by examiner

*Primary Examiner* — Dennis Pedder
(74) *Attorney, Agent, or Firm* — Fay Sharpe LLP

(57) ABSTRACT

An automotive vehicle including a folding rear compartment seat, the seat resides adjacent the vehicle body. The vehicle body includes a latch assembly accessible via a slot. A seat belt retractor is disposed within the vehicle body above the slot. A seat belt webbing extends from the retractor. The seat is comprised of a seat back and a seat base with a pivot interconnecting the back and base. An assembly including a striker and a webbing guide is secured to the seat back. The assembly comprises a first arm mounted to the seat back and engaging the striker element and a second arm adapted to receive the seat belt webbing.

20 Claims, 2 Drawing Sheets

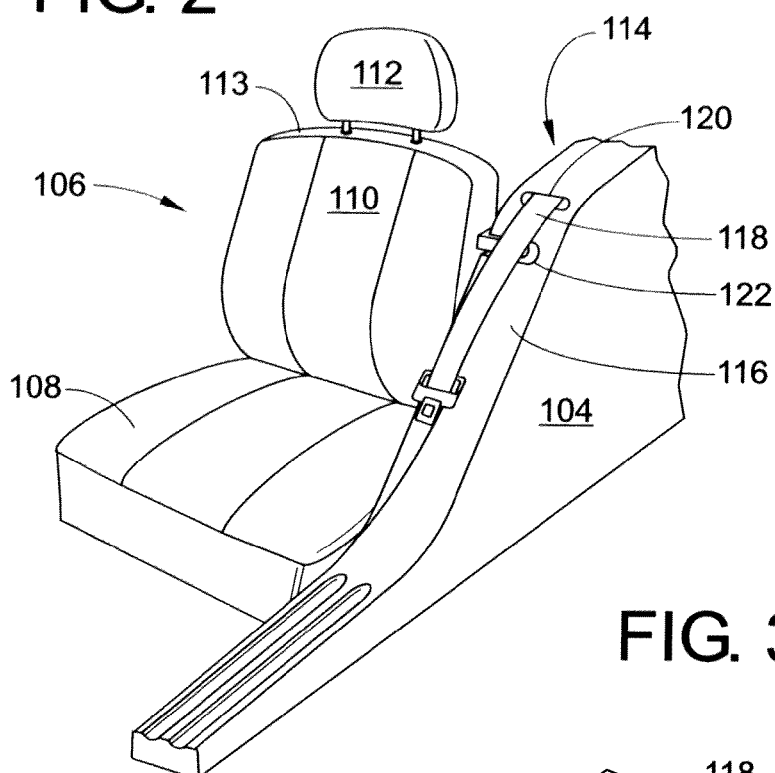
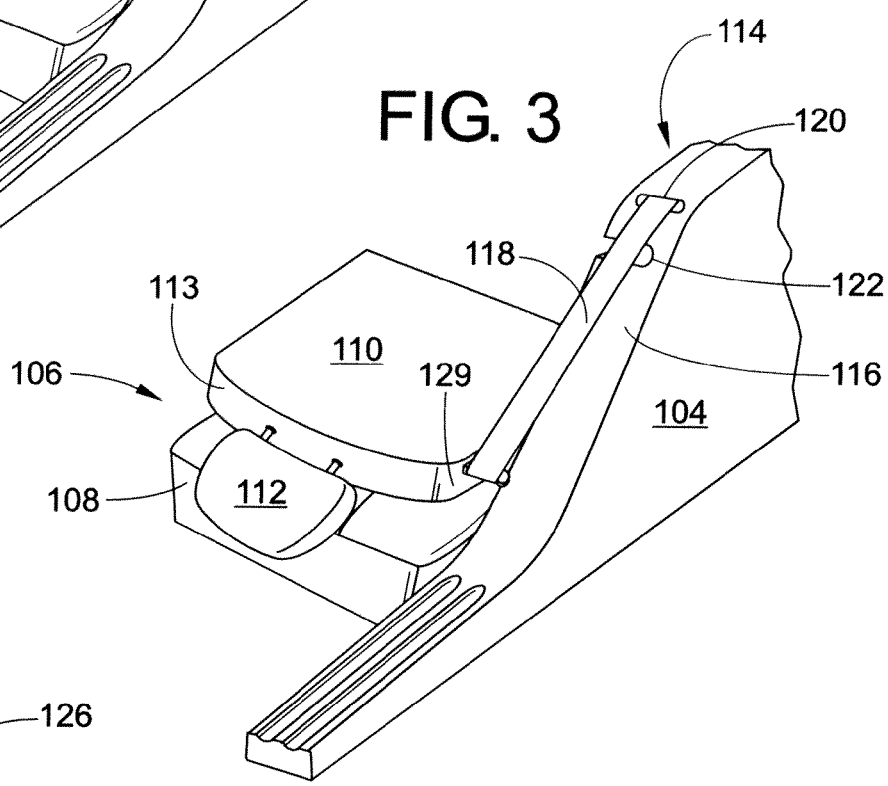
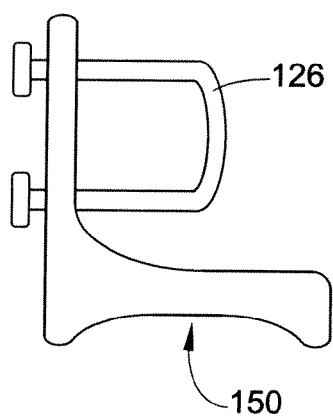

STRIKER WEBBING GUIDE ASSEMBLY

BACKGROUND

The present disclosure relates to an automotive vehicle folding passenger seat assembly. More particularly, one embodiment is directed to a striker seatbelt webbing guide assembly, and will be described with particular reference thereto. However, it is to be appreciated that the present exemplary embodiment is also amenable to other similar applications.

It is known to provide a vehicle seat, for example, an automotive seat with a foldable back. For example, it is well known in the art to provide folding seat backs to allow access to a cargo storage area through the opening in the partition between the passenger area and the cargo storage area of a vehicle. It is also known to provide a folding seat back to increase the storage area of a vehicle by folding over second and/or third row seats in a Sports Utility Vehicle (SUV), van, or the like.

In a typical configuration, the seat back includes a pivot located between the seat back and seat base. The seat back may also include a latch that engages a striker member attached to the vehicle body to secure the seat back in an upright, or designed seating position. Such seat configurations require that the latch be released to allow the seatback to pivot to the stowed position.

FIG. 1 is a partial sectional view illustrating a rear seat of a vehicle. A vehicle 1 includes a baggage compartment 4 in back of a seat 3 that is disposed in a vehicle cabin 2. The vehicle rear body comprises a vehicle floor portion 5 to form a floor face of the vehicle and a vehicle sidewall portion 6 to form a side face of the vehicle body. A wheel house 7 is provided at a vehicle sidewall portion 6 so as to project toward the inside of the vehicle 1. The seat 3 is disposed on the vehicle floor portion 5 and includes a seat back 11 and a seat cushion 13. The seat back 11 is supported by a hinge member 8 so as to rotate in a longitudinal direction of the vehicle and is biased forward by a coil spring disposed at the hinge member 8.

The seat back 11 is disposed with an inclined angle of 10-20 degrees relative to a vertical direction. In this upright position, the seat back 11 is supported by the hinge member 8 and an outside end portion of the seat back 11 is supported at the vehicle sidewall portion 6 by a striker 15 received in latch 19 provided at the outside end portion of seat back 11. The striker 15 is formed in a substantially U shape, and its both ends are connected to a striker attaching portion 16 that is formed in a substantially flat-plate shape.

In a narrow vehicle where a wide cargo space is desired, the seat back latching mechanism may be condensed. Moreover, in those vehicles, space limitations may dictate that the latch-striker assembly used to lock a seat back into an upright position include elements disposed within the vehicle body, generally disposed behind an interior vehicle lining. In such an environment, the seat belt is often also positioned in this region. If the seat belt extends near the latch opening it can potentially be damaged therein when the seat is returned from fold-down mode to in-use mode. Particularly, the striker can drag the belt into the latch opening where the latch mechanism can damage the seat belt webbing.

BRIEF DESCRIPTION

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of the summary is to present certain concepts of the disclosure in a simplified form prior to the more detailed description that is presented hereinafter.

According to one embodiment, a combination striker and seat belt webbing guide assembly for an automotive vehicle is provided. The assembly includes a plastic body and a metal striker element. The plastic body has a first arm with at least one passage allowing the striker element to penetrate therethrough and a second arm extending generally perpendicular to the first. The second arm includes a portion having a sufficient width to accommodate a seat belt webbing and a terminal shoulder.

According to another embodiment, a folding seat for an automotive vehicle is provided. The seat is comprised of a seat back and a seat base with a pivot interconnecting the back and the base. A combination striker and seat belt webbing guide assembly is mounted to the seat back. The assembly comprises a main body and a striker element. The main body includes a first arm abutting a side of the seat back. The striker element penetrates through the first arm and is secured to the seat back. The main body also includes a second arm extending generally perpendicular to the first with a surface adapted to receive a seat belt webbing.

According to a further embodiment, an automotive vehicle including a folding rear compartment seat is provided. The seat resides adjacent the vehicle body. The vehicle body has a latch assembly accessible via a slot. A seat belt retractor is disposed within the vehicle body above the slot. A seat belt webbing extends from the retractor. The seat includes a seat back and a seat base with a pivot interconnecting the back and base. An assembly including a striker and a webbing guide is secured to the seat back. The assembly includes a first arm receiving the striker element and a second arm adapted to receive the seat belt webbing.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings, in which:

FIG. 2 is a perspective view of an exemplary embodiment in an upright position;

FIG. 3 is a perspective view of the exemplary embodiment in a folded condition;

FIG. 5 is a top plan view of an alternative striker webbing guide assembly.

DETAILED DESCRIPTION

Figure 1:
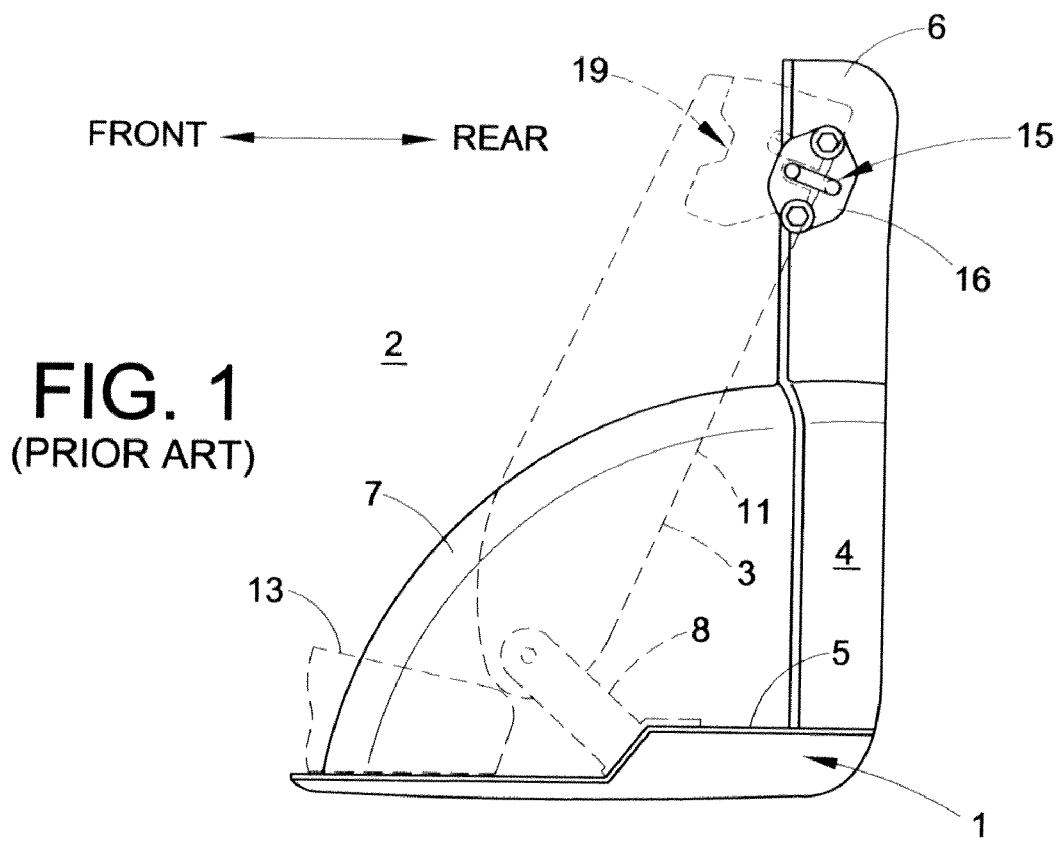
FIG. 1 is prior art folding seat.

One or more embodiments or implementations are hereinafter described in conjunction with the drawings, where like reference numerals are used to refer to like elements throughout, and where the various features are not necessarily drawn to scale.

Figure 4:
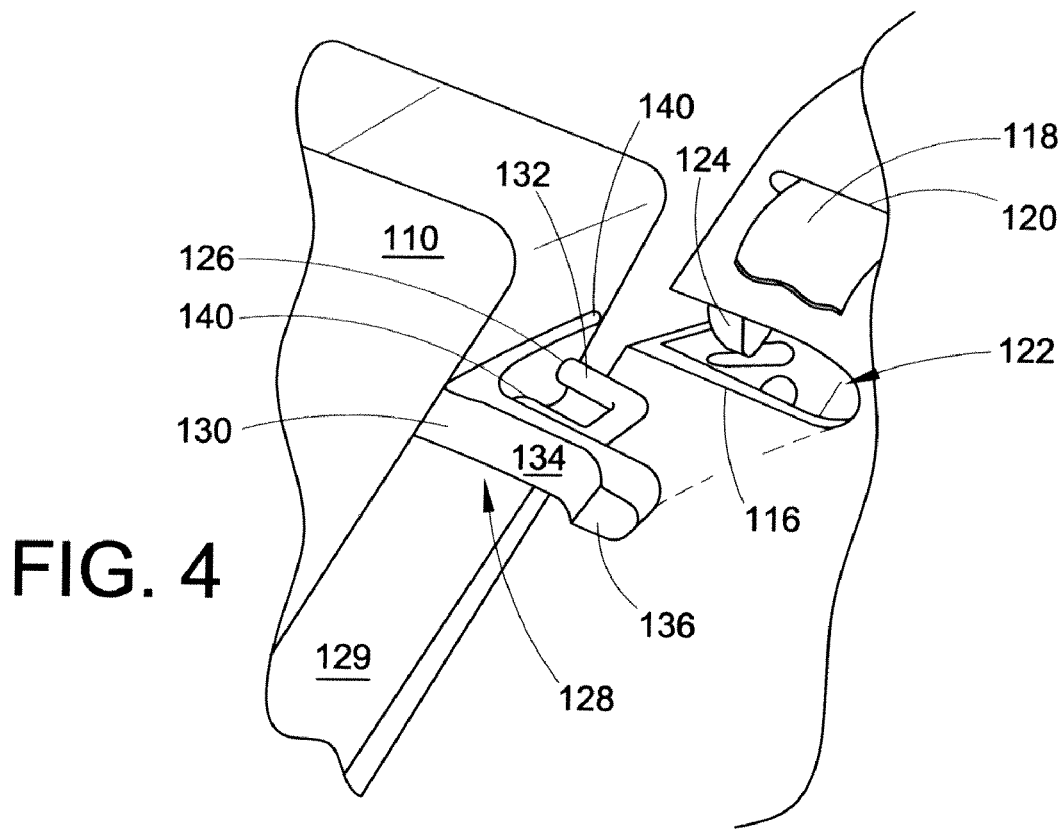
FIG. 4 is an exploded view of the webbing arm striker latch assembly.

With reference to FIGS. 2-4, a vehicle 104 is depicted including a seat assembly 106 having base 108 and back 110.

A headrest 112 extends from an upper edge 113 of back 110. Seat assembly 106 resides adjacent a vehicle side wall 114. Side wall 114 includes a decorative side lining 116, which houses a seat belt retractor assembly (not shown).

A seat belt webbing 118 extends through side lining 116 via a passage 120. A slot 122 is provided in side lining 116 to expose a latch assembly 124. Latch assembly 124 receives striker 126 to secure seat back 110 in an upright position (see FIG. 3). Locating the latch mechanism on the vehicle body side and striker on the seat advantageously allows relatively uncomplicated remote mechanical release of the seat from the rear hatch or elsewhere in the vehicle. Moreover, running release cabling to a latch assembly on the seat can be more complicated.

Striker 126 is one component of a striker webbing guide assembly 128 secured to a side edge 129 of seat back 110. Assembly 128 further includes webbing guide arm 130 and mounting arm 132. Webbing guide arm 130 includes a planar surface 134 and a terminal shoulder 136. Planar surface 134 and shoulder 136 cooperate to retain seat belt webbing 118 when seat back 110 is folded downward (see FIG. 3). Webbing guide arm 130 prevents seat belt webbing 118 from entering slot 122 and becoming pinched between striker 126 and latch 124 when seat back 110 is returned to an upright condition (see FIG. 2). As best seen in FIG. 4, mounting arm 132 and web guiding arm 130 are shaped and sized to substantially match the slot 122. In this manner, slot 122 is filled when seat back 110 is in an upright and locked position. To provide an improved structural orientation, the striker is mounted to seat back proximate the upper edge 113.

The "U" shaped striker 126 can be comprised of metal and extends through passages 140 in mounting arm 132 to allow direct attachment to internal structural components of seat back 110 (such as the frame). The striker element can be secured to the seat back frame by one of, for example, weld, bolt or screw. While it is feasible to join striker 126 to seat back 110 via mounting arm 132, direct attachment to seat back 110, is believed to increase the robustness of the design.

The web guiding arm 130 can have any shape suited to retaining the seat belt webbing. For example, referring to FIG. 5, a concave surface 150 would also function satisfactorily. Similarly, web guiding arm 130 could include a passage through which seat belt webbing 118 would pass. The arms can be formed of plastic or other material which provides a suitable smooth surface to facilitate unencumbered sliding of seat belt webbing 118 thereover.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A combination striker and seat belt webbing guide assembly for an automotive vehicle comprising a plastic body and a metal striker element, said body including a first arm having at least one passage allowing said striker element to penetrate there through and a second arm extending generally perpendicular to said first arm, said second arm including a surface having a sufficient width to accommodate a seat belt webbing and further including a terminal shoulder.

2. The assembly of claim 1 wherein said striker element comprises a "U" shape including two legs.

3. The assembly of claim 2 wherein said first arm includes two passages through which each leg of said striker element penetrates.

4. The assembly of claim 1 wherein said body comprises an "L" shape.

5. The assembly of claim 4 wherein said terminal shoulder extends normal to said second arm.

6. The assembly of claim 1 wherein said surface is one of a planar or concave.

7. A folding rear compartment seat for an automotive vehicle, said rear compartment seat comprised of a seat back and a seat base, a pivot interconnecting said back and said base, a combination striker and seat belt webbing guide assembly mounted to said seat back, the assembly comprising a main body and a striker element, said main body including a first arm abutting a side of said seat back, said striker element penetrating through said first arm and being secured to said seat back, the main body including a second arm extending generally perpendicular to said first arm and including a surface adapted to receive a rear compartment seat belt webbing.

8. The seat of claim 7 wherein said main body is comprised of plastic.

9. The seat of claim 7 wherein said surface is planar.

10. The seat of claim 7 wherein said assembly is located proximate a top surface of said seat back.

11. The seat of claim 7 wherein said first arm has a length substantially equivalent to a depth of said seat back.

12. The seat of claim 7 wherein said striker element is secured to said seat back by one of weld, bolt or screw.

13. The seat of claim 12 wherein said striker is metallic.

14. An automotive vehicle including a folding rear compartment seat, said seat residing adjacent the vehicle body, the vehicle body having a latch assembly accessible via a slot, a seat belt retractor disposed within the vehicle body above the slot, a seat belt webbing extending from said retractor, said seat comprised of a seat back and a seat base and a pivot interconnecting said back and said base, an assembly including a striker and webbing guide secured to the seat back, the assembly comprising a first arm mounted to a said seat back and receiving a striker element and a second arm adapted to receive the seat belt webbing wherein said slot is shaped to cooperatively receive said second arm.

15. The vehicle of claim 14 wherein said slot is shaped to cooperatively receive said first and said second arm.

16. The vehicle of claim 14 wherein said second arm is shaped to keep the seat belt engaged with said seat back throughout folding of said seat.

17. The vehicle of claim 16 wherein said second arm prevents said seat belt webbing from entering said slot.

18. The vehicle of claim 14 wherein said assembly is mounted to said seat back proximate a top surface.

19. The vehicle of claim 14 wherein said striker is mounted to a seat frame.

20. The assembly of claim 1 wherein said second arm is shaped to be cooperatively received within a slot formed in the associated automotive vehicle.

* * * * *